US009073339B2

(12) United States Patent
Huang et al.

(10) Patent No.: US 9,073,339 B2
(45) Date of Patent: Jul. 7, 2015

(54) METHOD AND SYSTEM FOR CONTROLLING MULTICOLOR INK-JET PRINTING ON INTERMITTENT ROTARY PRINTING DEVICE

(75) Inventors: Jianmei Huang, Beijing (CN); Tao Yang, Beijing (CN); Feng Chen, Beijing (CN)

(73) Assignees: Peking University Founder Group, Co., Ltd., Beijing (CN); Peking University, Beijing (CN); Beijing Founder Electronics Co., Ltd., Beijing (CN); Peking University Founder R&D Center, Beijing (CN)

( * ) Notice: Subject to any disclaimer, the term of this patent is extended or adjusted under 35 U.S.C. 154(b) by 53 days.

(21) Appl. No.: 13/977,844

(22) PCT Filed: Dec. 30, 2011

(86) PCT No.: PCT/CN2011/084978
§ 371 (c)(1),
(2), (4) Date: Sep. 5, 2013

(87) PCT Pub. No.: WO2012/089151
PCT Pub. Date: Jul. 5, 2012

(65) Prior Publication Data

US 2014/0002532 A1 Jan. 2, 2014

(30) Foreign Application Priority Data

Dec. 30, 2010 (CN) .......................... 2010 1 0623654

(51) Int. Cl.

| | |
|---|---|
| ***G06K 15/00*** | (2006.01) |
| ***H04N 1/46*** | (2006.01) |
| ***B41J 2/21*** | (2006.01) |
| ***B41F 19/00*** | (2006.01) |

(52) U.S. Cl.
CPC . *B41J 2/21* (2013.01); *B41F 19/007* (2013.01)

(58) Field of Classification Search
CPC ...................................................... B41F 13/04
USPC ......................... 358/1.1–3.29; 347/1–47, 117
See application file for complete search history.

(56) References Cited

U.S. PATENT DOCUMENTS

| | | | | |
|---|---|---|---|---|
| 7,216,948 | B2 | 5/2007 | Matsuzaki et al. | |
| 2007/0247651 | A1 * | 10/2007 | Maehira ....................... | 358/1.12 |
| 2009/0051717 | A1 | 2/2009 | Kuwahara | |

FOREIGN PATENT DOCUMENTS

| | | | |
|---|---|---|---|
| CN | 101372172 | A | 2/2009 |
| CN | 201538103 | U | 8/2010 |
| CN | 202053680 | U | 11/2011 |
| JP | 200553167 | A | 3/2005 |
| JP | 2007253337 | A | 10/2007 |

* cited by examiner

*Primary Examiner* — Marcellus Augustin
(74) *Attorney, Agent, or Firm* — The Webb Law Firm

(57) ABSTRACT

Disclosed is a control method for a digital ink-jet printing device to carry out multicolor ink-jet printing on an intermittent rotary printing device. The method includes: determining whether a current page is the first page; if yes, calculating a length of an image to be printed on the current page by subtracting a distance between an imaging component group and a reference from a length of a page, wherein the reference is the foremost printing imaging component group in a movement direction of a printed body, and acquiring image data of the current page, the length of which is the calculated length, after delaying the distance; if no, acquiring unprinted image data of a previous page, the length of which is the distance, and image data of the current page, the length of which is the calculated length.

9 Claims, 4 Drawing Sheets

METHOD AND SYSTEM FOR CONTROLLING MULTICOLOR INK-JET PRINTING ON INTERMITTENT ROTARY PRINTING DEVICE

CROSS-REFERENCE TO RELATED APPLICATIONS

This application is a United States national phase under 35 U.S.C. §371 of International Application No. PCT/CN2011/084978 filed Dec. 30, 2011, entitled "Method and System for Controlling Multicolor Ink-Jet Printing on Intermittent Rotary Printing Device" and claims priority under 35 U.S.C. §119(a)-(d) to Chinese Patent Application No. 201010623654.1, filed on Dec. 30, 2010 in the Chinese Intellectual Property Office, which are hereby incorporated by reference in their entireties.

TECHNICAL FIELD

The present invention relates to a field of digital ink-jet printing technology, particularly to a method and a system for controlling a digital ink-jet printing device to carry out multicolor ink-jet printing on an intermittent rotary printing device.

BACKGROUND ART

Digital ink-jet printing technology is a method for directly transmitting, processing and printing data in which steps of plate-making and proofing in a traditional printing process are omitted, and at the same time, as computer technology and control technology are introduced, the printing process is simplified and speeded up and the printed product is flexible. Of various movement ways of an imaging component relative to a printed body, the digital ink-jet printing device referred to herein is a digital ink-jet printing device in which the imaging component is static and the printed body moves relative to the imaging component so as to form an image by ink-jet printing. Due to restrictions of a resolution and a width of the imaging component itself, in this kind of digital ink-jet printing devices, an arrangement of superimposing the imaging components at staggered positions is mostly used to improve the resolution and spliced imaging components are used to widen the printed width. Since the digital ink-jet printing device uses a non-contact printing and it is necessary to control an imaging position of an ink droplet precisely in the printing process, currently the digital ink-jet printing devices are mostly used for full rotary printing devices or sheetfed printing devices, i.e. mostly used for printing devices in which the printed body moves in a single direction, and are less used for printing devices in which movements of the printed body are relatively complex (for example, an intermittent rotary printing device used in a traditional printing process).

FIG. 1 shows a schematic view of an installation mode of imaging components in a digital ink-jet printing device. As shown in FIG. 1, since all imaging components have a certain physical size, in the digital ink-jet printing device in which an expansion is mainly achieved by splicing, adjacent imaging component groups can not be installed in the same straight line, there is a certain physical distance between the imaging component groups.

For example, taking three imaging component groups as an example, assuming the imaging component group 1 and the imaging component group 3 are installed in a straight line, there is a distance a between the imaging component group 2 and the imaging component group 1. If three imaging component groups are controlled to print simultaneously, as shown in FIG. 2, there must be the distance a between printed images of the imaging component groups 1 and 2, thereby the entire image cannot be rendered.

In a full rotary printing device, since the printed body moves in a relatively single way and the printed body always moves forward, the problem may be solved by controlling time of ink-jet printing performed by each of the imaging component groups. In particular, it is assumed that the printed body moves along the following direction: the printed body first passes the imaging component groups 1 and 3, and then passes the imaging component group 2. In this case, the imaging component groups 1 and 3 are controlled to print images simultaneously and the imaging component group 2 is delayed with the distance a, so when images printed by the imaging component groups 1 and 3 reach the imaging component group 2, the imaging component group 2 begins to print. In this way, integrity of the image can be ensured.

As for a printing device in which movements of the printed body are more complex, for example an intermittent rotary printing device, since the printed body of the intermittent rotary printing device moves forward and backward, that is, the printed body doesn't always move forward, there is a backward process. Still taking above three imaging component groups as an example, the printed body moves bi-directionally, it moves forward (i.e. it passes the imaging component groups 1 and 3 and then passes the imaging component group 2), and then it moves backwards (i.e. it passes the imaging component group 2 and then passes the imaging component groups 1 and 3), thus a circle is completed, and so on.

FIG. 3 shows a curve diagram of a speed of the printed body of the intermittent rotary printing device during a forward stage. As shown in FIG. 3, in a printing process, the intermittent rotary printing device accelerates the printed body (A. stage of acceleration) and when the speed of the printed body is accelerated to a predetermined speed, the printed body is in uniform motion for a certain distance (B. stage of uniform motion), and then the intermittent rotary printing device decelerates the printed body (C. stage of deceleration), preparing for a backward movement. Throughout this process, the printed body always moves forward. Assuming a distance that the printed body moves forward during the acceleration process is L1, a distance that the printed body moves forward at the constant speed is L2 (which is referred to as a skip distance) and a distance that the printed body moves forward during the deceleration process is L3, then during the entire forward process, a distance L that the printed body moves forward is L1+L2+L3. However, in practice, the intermittent rotary printing device performs printing only during the constant speed stage, that is, among the forward distances, only the distance L2 is valid and other distances are invalid. Subsequently, the printed body moves backward for a distance L1+L3 during the backward stage in which the printing is not performed.

When the digital ink-jet printing device is used for the intermittent rotary printing device, ink-jet printing is only performed during the constant speed stage in the forward stage in order to match with the printed image. Following above control mode of the full rotary printing device, after entering the constant speed stage, the imaging component groups 1 and 3 perform ink-jet printing, and the imaging component group 2 performs the printing after delaying a distance a. Thus, an image illustrated in FIG. 4 may be obtained. That is, during the constant speed stage, a distance that the printed body moves is L2, a valid ink-jet printing distance of the imaging component groups 1 and 3 is L2, and a valid ink-jet printing distance of the imaging component group 2 is L2−a. In order to ensure integrity of the image, a length of the ink-jet printed image may be selected to be less than L2−a, so during the constant speed stage, the entire image can be ink-jet printed completely. Thus, not only the integrity of the image can be ensured, but also a control mode being the same as that of the full rotary printing device can be used, however, the medium in length of a is wasted during every constant speed stage and the production efficiency is also reduced.

SUMMARY OF THE INVENTION

In order to solve above problems, the present invention provides a method and a system for controlling multicolor ink-jet printing on an intermittent rotary printing device, for applying the digital ink-jet printing device on the intermittent rotary printing device so as to print an image with a same length as that in a traditional intermittent printing.

In order to achieve above objects, a control method for a digital ink-jet printing device to carry out multicolor ink-jet printing on an intermittent rotary printing device provided by the present invention performs the following control operations for each imaging component group respectively: determining whether a current page to be printed is the first page of a job to be printed; if the current page is the first page, calculating a length of an image to be printed on the current page by subtracting a distance between the imaging component group and a reference from a length of an image of a page of the job, wherein the reference is the foremost printing imaging component group in a movement direction of a printed body, acquiring image data of the current page, the length of which is the calculated length, from a data storage space storing image data of the job after delaying the distance, and sending the acquired data to the digital ink-jet printing device to carry out the printing; if the current page is not the first page, acquiring unprinted image data of a previous page, the length of which is the distance, and image data of the current page, the length of which is the calculated length, from the data storage space, and sending the acquired data to the digital ink-jet printing device to carry out the printing; determining whether the current page is the last page of the job, and if the current page is not the last page of the job, repeating the steps mentioned above.

Accordingly, the present invention provides a control system for a digital ink-jet printing device to carry out multicolor ink-jet printing on an intermittent rotary printing device, said control system includes a plurality of control devices for controlling each of imaging component groups respectively, and each of the control devices includes: a register stack for storing a length of an image of a page of a job to be printed and a distance between an imaging component group controlled by the control device and a reference, wherein the reference is the foremost printing imaging component group in a movement direction of a printed body; a determining unit for determining whether a current page to be printed is the first page; a selecting switch for selecting the distance when the determining unit determines that the current page is the first page, and selecting 0 when the determining unit determines that the current page is not the first page; a subtracter for subtracting the selection result of the selecting switch from the length of the image stored in the register stack to obtain a length of an image to be printed on the current page; a counter for counting delays in the following manner: starting from an initial value corresponding to the selection result of the selecting switch, the counter value is decreased by 1 every time a unit distance is delayed until the counter value becomes 0; a data reading unit for acquiring image data of the current page to be printed from a data storage space storing image data of the job in the following manner when the counter value becomes 0 and sending the acquired data to the digital ink-jet printing device to carry out the printing: when the determining unit determines that the current page is the first page, acquiring the image data of the current page, the length of which is the value of the subtracter; when the determining unit determines that the current page is not the first page, acquiring unprinted image data of a previous page, the length of which is the distance stored in the register stack and the image data of the current page, the length of which is a value obtained by subtracting the distance from the value of the subtracter.

The present invention achieves an effective control for applying a digital printing device on an intermittent rotary printing device, thus providing a new printing process in which the digital ink-jet printing technology and the intermittent rotary printing technology are combined together, and since characteristics of the intermittent rotary printing device itself and the movement mode of its printed body are fully combined, not only the production efficiency of the original intermittent printing is maintained, but also the utilization rate of a medium material is greatly improved.

DETAILED DESCRIPTION

Hereinafter, the present invention will be described with reference to the accompanying drawings and embodiments.

As described above, when the intermittent rotary printing device is printing, a distance L1+L2+L3 is moved forward each time, wherein the printing is performed during a course of moving forward for a distance L2 at a constant speed, and then a distance L1+L3 is moved backward. When the printing being performed after moving a distance L1 by accelerating once again, the position of the printed body is just at the stop position of a previous printing, that is, an image to be printed at this time could just be connected to a previously printed image. The technical concept of the present invention is to combine the digital ink-jet printing device and the intermittent rotary printing device better by using this characteristic of the intermittent rotary printing device.

Figure 1:
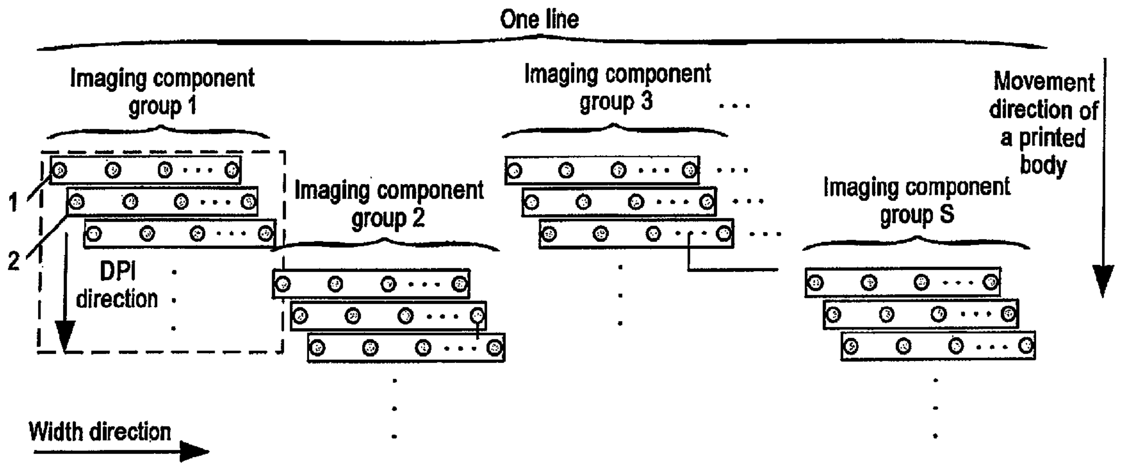
FIG. 1 PRIOR ART
FIG. 1 is a schematic view of an installation mode of imaging components in a digital ink-jet printing device.
Figure 2:
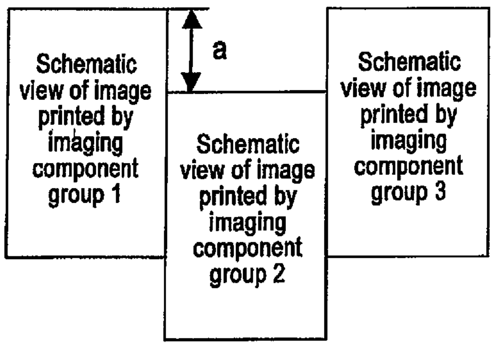
FIG. 2 PRIOR ART
FIG. 2 is a schematic view of an effect that all imaging component groups in a digital ink-jet printing device perform printing simultaneously.
Figure 3:
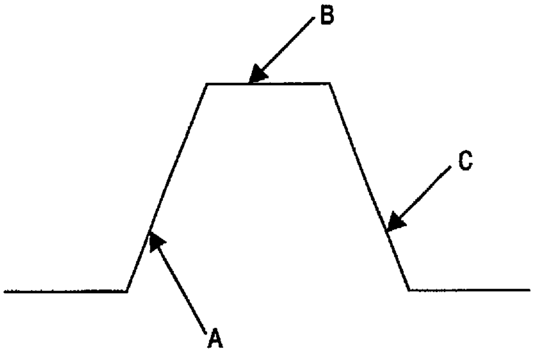
FIG. 3 PRIOR ART
FIG. 3 shows a curve diagram of a speed of a printed body of an intermittent rotary printing device during a forward stage.
Figure 4:
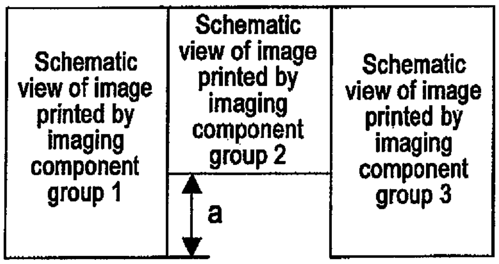
FIG. 4 PRIOR ART
FIG. 4 is a schematic view of an effect that printing is performed on an intermittent rotary printing device using the same control mode as that for a full rotary printing device.
Figure 5:
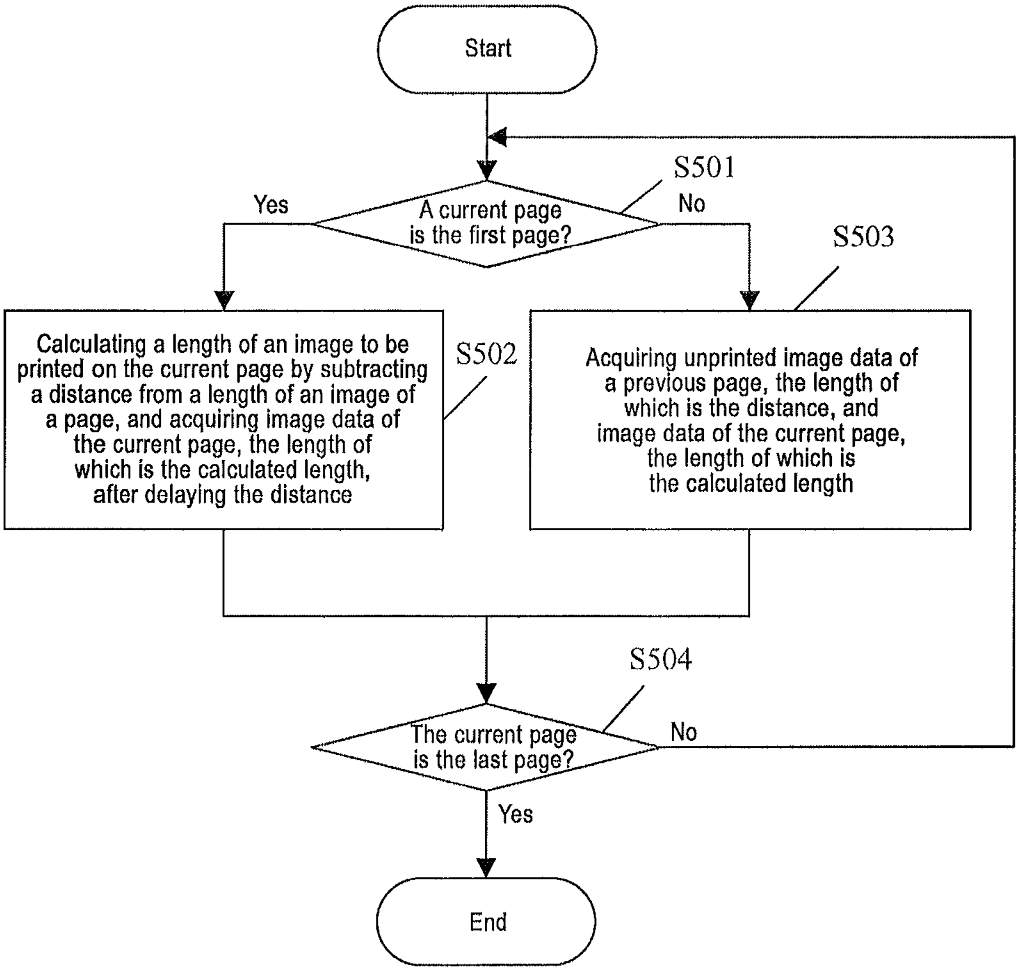
FIG. 5 is a flowchart of a control method for a digital ink-jet printing device to carry out multicolor ink-jet printing on an intermittent rotary printing device according to the present invention.

FIG. 5 is a flowchart of the control method for a digital ink-jet printing device to carry out multicolor ink-jet printing on an intermittent rotary printing device according to the present invention.

As shown in FIG. 5, first, at step S501, it is determined whether a current page to be printed is the first page of a job to be printed, and if yes, step S502 is performed, otherwise step S503 is performed.

At step S502, a length of an image to be printed on the current page is calculated by subtracting a distance between an imaging component group and the foremost printing imaging component group in a movement direction of a printed body from a length of an image of a page of the job, and image data of the current page, the length of which is the calculated length, is acquired from a data storage space storing image data of the job after delaying the distance, and the acquired data is sent to the digital ink-jet printing device to carry out the printing.

At step S503, unprinted image data of a previous page, the length of which is the distance, and image data of the current page, the length of which is the calculated length are acquired from the data storage space, and the acquired data is sent to the digital ink-jet printing device to carry out the printing.

Finally, at step S504, it is determined whether the current page is the last page of the job, and if yes, the printing process is completed, otherwise skipping to step S501.

Still taking above three imaging component groups 1, 2 and 3 as an example, the imaging component groups 1 and 3 are located in the front of the direction in which papers move and perform printing simultaneously, and the imaging component group 2 is spaced apart from the imaging component groups 1 and 3 by a distance a and starts printing after delaying the distance a when the imaging component groups 1 and 3 start printing.

As for the imaging component group 2, according to the flowchart illustrated in FIG. 5, when the current page to be printed is the first page, a length of an image to be printed on the first page is calculated as (L2−a), and then after delaying a distance a, image data in length of (L2−a) for the first page is acquired. At this time, a length of the printed image is (L2−a). When the current page to be printed is not the first page, unprinted image data in length of (a) for a previous page and image data in length of (L2−a) for the current page are acquired. At this time, the length of the printed image is L2.

As for the imaging component groups 1 and 3, the distance a is 0. According to the flowchart illustrated in FIG. 5, regardless of which page, the length of the printed image is L2.

In addition, during the printing process, it may be possible to compare the length of the printed image with the calculated length, so as to determine whether the current page is printed completely. Moreover, in order to make it easy for data management, image data can be divided into individual spaces for management according to the imaging components, that is, image data to be printed by each imaging component group can be individually stored in a different data storage space, such that the data spaces of the imaging component groups don't interfere with each other.

Accordingly, the present invention also provides a control system for a digital ink-jet printing device to carry out multicolor ink-jet printing on an intermittent rotary printing device, and this control system can achieve above control method in a form of general hardware. In this control system, a corresponding control device is designed for each imaging component group.

Figure 6:
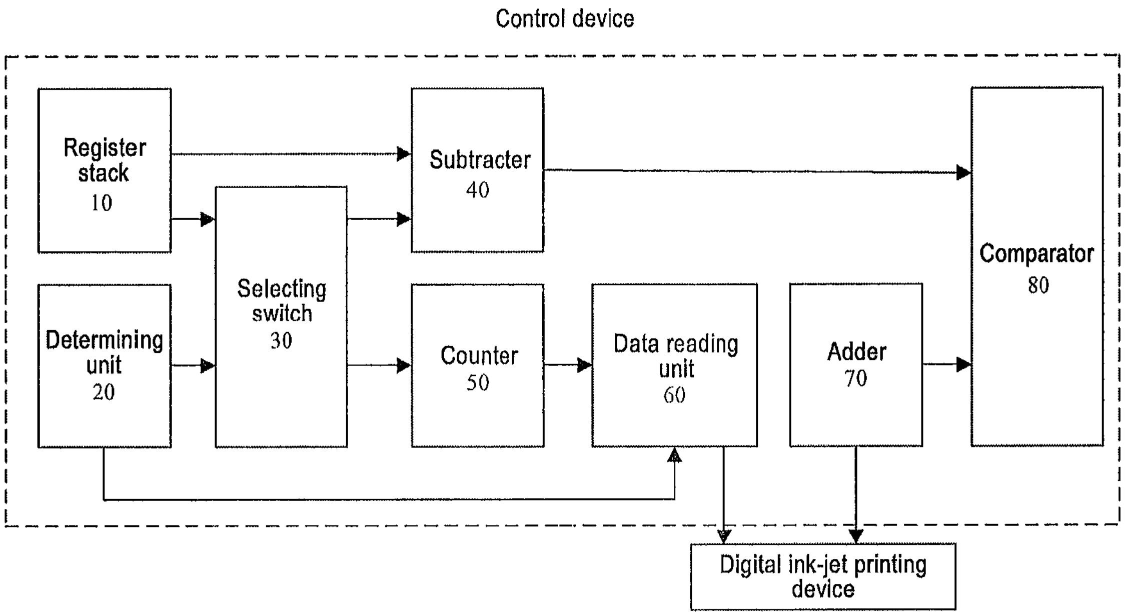
FIG. 6 is a block diagram of a structure of a control device for a digital ink-jet printing device to carry out multicolor ink-jet printing on an intermittent rotary printing device according to the present invention.

As shown in FIG. 6, the control device mainly includes a register stack 10, a determining unit 20, a selecting switch 30, a subtracter 40, a counter 50 and a data reading unit 60.

Wherein, the register stack 10 stores a length of an image of a page of a job to be printed and a distance between an imaging component group controlled by the control device and a reference, herein the foremost printing imaging component group in a movement direction of a printed body is designated as the reference, that is, the distance between an imaging component group controlled by the control device and the foremost printing imaging component group in the movement direction of the printed body is stored.

The determining unit 20 determines whether a current page to be printed is the first page. The determining unit 20 may include a counter and a comparator, wherein, the counter counts the number of printed pages and an initial value is 0; the comparator compares the counter value with 1, and if the counter value is less than 1, it is determined that the current page is the first page, otherwise it is determined that the current page is not the first page.

The selecting switch 30 selects the distance when the determining unit 20 determines that the current page is the first page and selects 0 when the determining unit 20 determines that the current page is not the first page.

The subtracter 40 subtracts the selection result of the selecting switch 30 from the length of the image stored in the register stack 10 so as to obtain a length of an image to be printed on the current page.

The counter 50 counts delays in the following manner: starting from an initial value corresponding to the selection result of the selecting switch 30, every time a unit distance is delayed, the counter value is decreased by 1 until the counter value becomes 0. Herein, the unit distance is defined as follows: when seen from the movement direction of the printed body, bitmap data of the image in one page may be considered to be made up of many lines, and a distance between every two lines is referred to as a unit distance.

The data reading unit 60 acquires image data of the current page to be printed from a data storage space storing image data of the job in the following manner when the counter value becomes 0 and sends the acquired data to the digital ink-jet printing device to carry out the printing: when the determining unit 20 determines that the current page is the first page, acquiring the image data of the current page, the length of which is the value of the subtracter; when the determining unit 20 determines that the current page is not the first page, acquiring unprinted image data of a previous page, the length of which is the distance stored in the register stack 10 and the image data of the current page, the length of which is a value obtained by subtracting the distance from the value of the subtracter.

In addition, the control device may further includes an adder 70 and a comparator 80, wherein, the adder 70 calculates a length of the printed image in the following manner: the value of the adder is increased by 1 every time data of a unit distance is printed; the comparator 80 compares the value of the adder with the value of the subtracter (i.e. the length of the image to be printed on the current page) so as to determine whether the current page is printed completely. If the current page is not printed completely, operations of the adder 70 and the comparator 80 are continued until the comparator 80 determines that the value of the adder equals to the value of the subtracter. If the current page is printed completely and the job to be printed has not been printed completely, the register stack 10, the determining unit 20, the selecting switch 30, the subtracter 40, the counter 50, the data reading unit 60, the adder 70 and the comparator 80 continue to repeat above operations, so as to perform printing on a next page.

In addition, the control device further includes a counter or an adder for counting the number of printed pages, and when the value of the counter or the adder equals to the number of pages of the job, the entire printing process is finished.

In the following, a description will be made still taking above three imaging component groups 1, 2 and 3 as an example.

As for the imaging component group 2, in the register stack 10 of its control device, the length L2 of an image of a page and the distance a are stored. When the determining unit 20 determines that the current page is the first page, the selecting switch selects the distance a. At this time, the value of the subtracter is (L2−a), and a printing length of the first page is obtained as (L2−a). The counter 50 counts delays. When the counter value becomes 0, the data reading unit 60 acquires image data of the first page, the length of which is (L2−a). When the determining unit 20 determines that the current page is not the first page, the selecting switch selects 0. At this time, the value of the subtracter is L2, and a printing length of the page is obtained as L2. The value input into the counter 50 is 0, so the counter 50 is not required to count delays, and the data reading unit 60 directly acquires unprinted image data of a previous page, the length of which is a, and the image data of the current page, the length of which is (L2−a). At this time, the length of the printed image is L2.

As for the imaging component groups 1 and 3, in the register stack 10 of their control devices, the length L2 of an image of a page and the distance 0 are stored. When the determining unit 20 determines that the current page is the first page, the selecting switch selects the distance 0. At this time, the value of the subtracter is L2, and a printing length of the first page is obtained as L2. The value input into the counter 50 is 0, so the counter 50 is not required to count delays, and the data reading unit 60 directly acquires image data of the first page, the length of which is L2. When the determining unit 20 determines that the current page is not the first page, the selecting switch selects 0. At this time, the value of the subtracter is L2, and a printing length of the page is obtained as L2. The value input into the counter 50 is 0, the counter 50 is not required to count delays, and the data reading unit 60 directly acquires image data of the first page, the length of which is L2.

Figure 7:
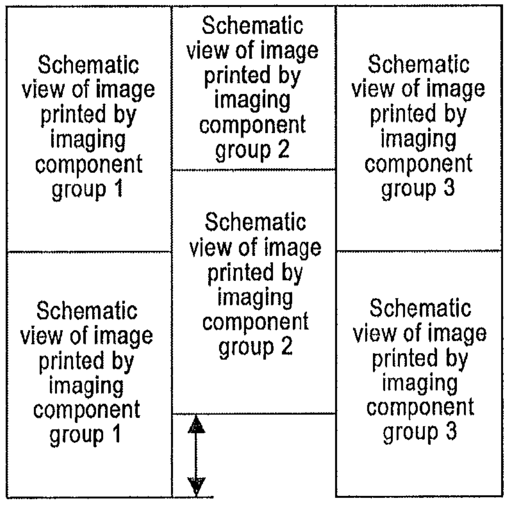
FIG. 7 is a schematic view of an effect of printing performed by the control method according to the present invention.

FIG. 7 is a schematic view of an effect of printing performed by the control method and the control device according to the present invention. As shown in FIG. 7, as for the imaging component groups 1 and 3, a valid printing distance is L2 on each page; the imaging component group 2 starts to print after delaying a distance a, and the valid printing distance on the first page is (L2−a) and the valid printing distances on the following pages are all L2.

It can be seen from above description that the imaging component groups 1 and 3 may use the same control devices as that of the imaging component group 2, without additionally providing other control devices, and the difficulty of development is reduced. Moreover, the control device of the present invention is implemented by using general hardware. It is real-time, and has high stability and simple usage, making the digital ink-jet printing device fully integrated into the intermittent rotary printing device. The production efficiency in the traditional intermittent rotary printing is retained while a new process is added. Moreover, the distance in the register stack provided in above control device may be changed easily, so that it is easy to be changed to different hop distances, for fitting live parts of various sizes, and the use scope of the digital ink-jet printing device is improved.

As described above, though the present invention has been described in detail with reference to the accompanying drawings and embodiments, it should be understood that the invention is not limited to specific embodiments disclosed above, and any modification based on the technical solutions disclosed herein should be included in the protection scope of the present invention.

The invention claimed is:

1. A control method for a digital ink-jet printing device to carry out multicolor ink-jet printing on an intermittent rotary printing device, the digital ink-jet printing device including a plurality of imaging component groups, said control method performs the following control operations for each of the imaging component groups, respectively:

determining whether a current page to be printed is the first page of a job to be printed;

if the current page is the first page, calculating a length of an image to be printed on the current page by subtracting a distance between the imaging component group and a reference from a length of an image of a page of the job, wherein the reference is the foremost printing imaging component group in a movement direction of a printed body, acquiring image data of the current page, the length of which is the calculated length, from a data storage space storing image data of the job after delaying the distance, and sending the acquired data to the digital ink-jet printing device to carry out the printing;

if the current page is not the first page, acquiring unprinted image data of a previous page, the length of which is the distance, and image data of the current page, the length of which is the calculated length, from the data storage space, and sending the acquired data to the digital ink-jet printing device to carry out the printing; and determining whether the current page is the last page of the job, and if the current page is not the last page of the job, repeating the steps mentioned above.

2. The control method of the claim 1, wherein, the control operations further includes:

in the printing process, comparing the length of the printed image with the calculated length to determine whether the current page has been printed completely.

3. The control method of the claim 1, wherein, as for the foremost printing imaging component group in the movement direction of the printed body, the distance is zero (0).

4. The control method of the claim 1, wherein, image data to be printed by each imaging component group is separately stored in different data storage space.

5. A control system for a digital ink-jet printing device to carry out multicolor ink-jet printing on an intermittent rotary printing device, the digital ink-jet printing device including a plurality of imaging component groups, said control system including a plurality of control devices for controlling each of imaging component groups respectively, and each of the control devices comprises:

a register stack for storing a length of an image of a page of a job to be printed and a distance between an imaging component group controlled by the control device and a reference, wherein the reference is the foremost printing imaging component group in a movement direction of a printed body;

a determining unit for determining whether a current page to be printed is the first page;

a selecting switch for selecting the distance when the determining unit determines that the current page is the first page, and selecting zero (0) when the determining unit determines that the current page is not the first page;

a subtracter for subtracting the selection result of the selecting switch from the length of the image stored in the register stack to obtain a length of an image to be printed on the current page;

a counter for counting delays in the following manner: starting from an initial value corresponding to the selection result of the selecting switch, a counter value is decreased by one (1) every time a unit distance is delayed until the counter value becomes zero (0); and a data reading unit for acquiring image data of the current page to be printed from a data storage space storing image data of the job in the following manner when the counter value becomes zero (0) and sending the acquired data to the digital ink-jet printing device to carry out the printing: when the determining unit determines that the current page is the first page, acquiring the image data of the current page, the length of which is a value of the subtracter; when the determining unit determines that the current page is not the first page, acquiring unprinted image data of a previous page, the length of which is the distance stored in the register stack and the image data of the current page, the length of which is a value obtained by subtracting the distance from the value of the subtracter.

6. The control system of the claim 5, wherein, the control device further includes:

an adder for calculating a length of the printed image in the following manner: a value of the adder is increased by one (1) every time data of a unit distance is printed; and a comparator for comparing the value of the adder with the value of the subtracter so as to determine whether the current page is printed completely.

7. The control system of the claim 5, wherein, as for the foremost printing imaging component group in the movement direction of the printed body, the distance is zero (0).

8. The control system of the claim 5, wherein, image data to be printed by each imaging component group is separately stored in different data storage space.

9. The control system of the claim 5, wherein, the determining unit includes a second counter and a second comparator, wherein the second counter counts the number of printed pages and an initial value of the second counter is zero (0); the second comparator compares a value of the second counter with one (1), and if the value of the second counter is less than one (1), it is determined that the current page is the first page, otherwise it is determined that the current page is not the first page.

* * * * *